Figure 1:
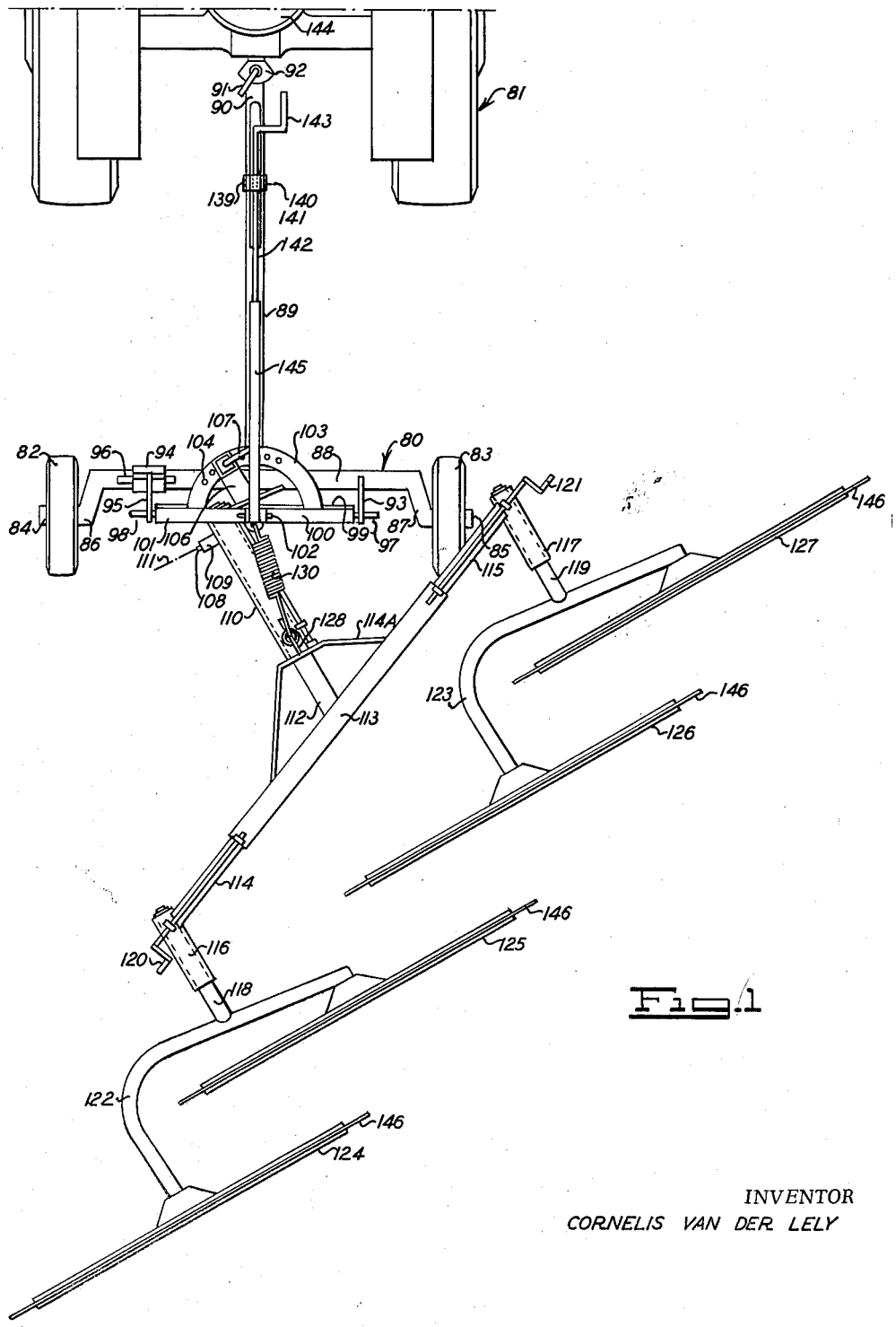

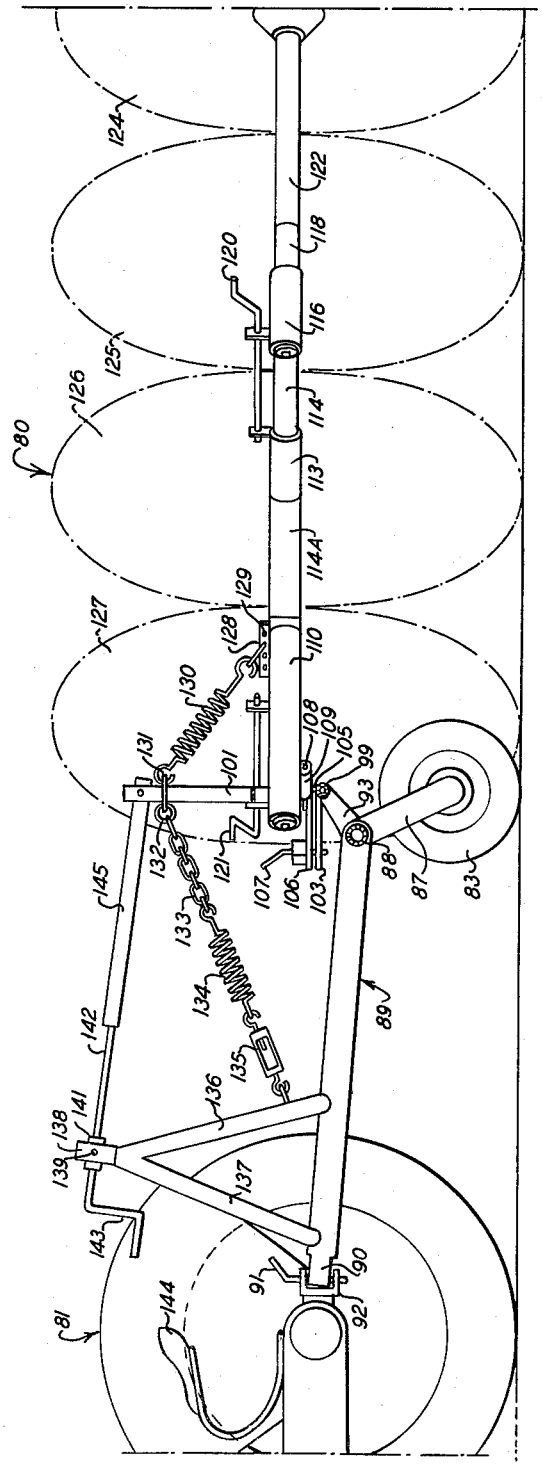

United States Patent Office 2,988,865
Patented June 20, 1961

2,988,865
ROTARY WHEEL RAKE WITH A WHEELED
AUXILIARY COUPLING DEVICE
Cornelis van der Lely, Maasland, Netherlands, assignor to
C. van der Lely N.V.
Filed Mar. 1, 1957, Ser. No. 643,375
Claims priority, application Netherlands Mar. 9, 1956
8 Claims. (Cl. 56—377)

This invention relates to a raking device for laterally displacing crop or the like material lying on the ground and especially to a side delivery rake, the device being of the kind comprising a frame movable on ground wheels which may be connected to the frame or belonging to the tractor by which the device is moved, and a plurality of rake wheels each of which is arranged oblique to the intended direction of travel of the device, and is mounted for rotation about a substantially horizontal axis so as to be rotated by coming into contact with the ground or material lying thereon.

Devices of the kind set forth are known, but have the disadvantage that only with difficulty can they be brought into a transport position, i.e. a position in which the rake wheels are raised clear from the ground, since generally the rake wheels have to be lifted and secured in place individually.

It is an object of the present invention to provide a device of the kind set forth which can readily be brought into a transport position.

According to the invention there is provide a raking device of the kind set forth, wherein the rake wheels as a whole are turnable about a horizontal pivot member, the axis of which lies at an angle to the axes of rotation of the rake wheels, and wherein lifting means in provided for raising the rake wheels from contact with the ground, the lifting means being arranged to turn the rake wheels or at least a number of the rake wheels as a whole about said pivot member.

Thus with this construction, a single movement of the hand may be sufficient to cause the rake wheels to be lifted from the ground, the device being thus ready for transport without the need for further operations.

A suitable construction is obtained by associating a spring between a rake wheel and the lifting means so that, during transport, the rake wheels are suspended on the frame in a resilient manner and there is no objection to transporting the device at high speed, whilst the forces exerted on the device are smaller, so that the device may be lighter in construction. The device has a traction arm which is positioned around a shaft, and on which is seated a control-handle for the lifting means, this handle being coupled to a member connected to the axles of the rake wheels by means of a transmission system, which is arranged partly over the axis of the traction arm. Thus the lifting means can always be operated by the driver of the device from his seat in the vehicle pulling the device.

For a better understanding of the invention, and to show how the same may be carried into effect, reference will now be made to the accompanying drawings in which:

FIG. 1 is a plan view of the raking device according to the invention, and FIG. 2 is a lateral view thereof with a portion broken away.

Referring now to FIGS. 1 and 2, there is shown a device 80 for laterally displacing material lying on the ground, the device being pulled by a tractor 81. The device 80 is provided with ground or running wheels 82 and 83, of which the axles 84 and 85 are connected by means of rods 86 and 87 to a horizontal beam 88, to the center of which is secured a substantially horizontal traction arm 89. The front end 90 of the traction arm 89 is detachably secured to a fork 92 on the tractor 81 by means of a locking pin 91. The beam 88 supports a fixed arm 93 and a slidable sleeve 94 which is provided with an arm 95, rotation of the sleeve 94, about the beam 88 being prevented by a key 96. The arms 93 and 95 constitute bearings for stub axles 97 and 98 of a horizontal beam 99, the ends of which support upwardly directed, slanting rods 100 and 101, these rods being interconnected at their top ends to constitute a yoke by a pin 102 (FIG. 2). The beam 99 also carries a semi-circular, plane strip 103 which is formed with apertures 104, and, finally, the beam 99 carries a vertical pin 105; about which an arm 106 is rotatable, the arm 106 being adapted to be fixed in different positions relative to the strip 103, by means of a locking pin 107. A horizontal shaft 108 is connected to the arm 106 and a sleeve 109 is rotatable about the shaft 108, the sleeve or horizontal pivot means 109 being secured to a tube 110 which also extends substantially horizontally and the longitudinal direction of which is at right angles to the centre line 111 of the shaft 108.

A shaft 112 is journalled in the tube 110, and is adapted to rotate but not to slide in the tube 101. The rear end of the shaft 112 supports a substantially horizontal beam or mobile frame 113, the junction between the shaft and the beam being reinforced by a strip 114A. Rods 114 and 115 are mounted in the ends of the beam 113 so as to be slidable, but not rotatable, the free ends of the rods or slidably engaged sections 114 and 115 supporting sleeves 116 and 117 in which parallel shafts 118 and 119 are rotatable but not slidable. The distances between the shafts 118 and 119 and the shaft 112 may be varied by means of adjusting devices 120 and 121. The shafts 118 and 119 carry bows 122 and 123, the bow 122 supporting two rake wheels 124 and 125 which are freely rotatable about their own axles, and the bow 123 supporting two rake wheels 126 and 127 which are also rotatable about their own axles.

In the operational position of the device shown in FIGS. 1 and 2, the rake wheels 124, 125, 126 and 127 are aligned and disposed in a row in overlapping relation, so that the device constitutes a side delivery rake. By turning this row through 180° about the centre line of the shaft 112, which is performed by turning the shaft 112 through 180° in the tube 110, a working position is obtained in which the device constitutes a tedder. If the shaft 112 is not turned, and if the shafts 118 and 119 are turned through 180°, a working position is obtained in which the device constitutes a swath turner.

In order to reduce the pressure of the rake wheels 124 to 127, a strip 128 is provided on the tube 110, the strip 128 having holes 129, and one end of a draw spring 130 being secured to the strip 128. The upper end of the draw spring or first resilient means 130 is secured to an eye 131 which is rigidly secured to the rods 100 and 101. An eye 132 is rigidly secured to the eye 131, and one end of a chain 133 is connected to the eye 132. One end of a spring or second resilient means 134 is hooked in one of the links of the chain 133, and the other end of the spring 134 is secured by means of a stretching device 135 to the rod 136 of two rods 136 and 137 which are secured rigidly to the traction arm 89. The rods 136 and 137, which lie in a vertical plane passing through the traction arm 89, support a fork 138, of which the limbs constitute bearings for pins 139 and 140. The pins 139 and 140 are secured to a sleeve 141 in which a spindle 142 is adapted to rotate but not to slide, the spindle 142 being provided at the front end with a crank or control means 143 which can be readily turned by the driver of the tractor 81 from the seat 144. The rear end of the spindle 142 is screwthreaded and can be screwed into an internally threaded tube 145, the rear end of which is pivotally secured by means of the pin 102.

When the device 80 is pulled by the tractor 81, the wheels 82 and 83 roll on the ground, whilst the rake wheels 124 to 127 move over the ground and their circumferential teeth 146 laterally displace the material lying on the ground. When the driver of the tractor 81 turns the crank 143 in a manner such that the pin 102 and the fork 138 are caused to approach one another by virtue of the engagement of the threaded end of the spindle 142 in the tube 145, the spring 130 will be stretched and the pressure of the rake wheels on the ground will be reduced, or the rake wheels will be raised from contact with the ground. Turning of the crank 143 is facilitated by the action of the spring 134, so that the pin 102 can be moved forwards comparatively easily. The crank 143 can also be easily turned in the opposite direction, since the force of the spring 134 does not differ much from that of the spring 130 in the working position.

It is obvious that the centre of gravity of the device 80 lies behind the wheels 82 and 83, and therefore, the tractor exerts a downward force on the front end 90 of the traction arm 89. The wheels 82 and 83 transfer this force exerted on the front end 90 and the weight of the device 80, reduced by the total pressure of the four rake wheels on the ground, to the ground. Consequently, when the front end 90 is detached from the tractor, the pin 102 will be moved by the spring 130 towards the strip 128, so that the front end 90 will move upwards. When attaching the device again to the tractor 81 or to a different vehicle, this stress must be overcome, which can only be achieved with difficulty by one person. However, the crank 143 can be turned in a manner such that the distance between the fork 138 and the pin 102 increases materially (i.e. by reversing the raising operation), so that the spring 134 will be stretched and the arm 89 will move downwardly so that the device 80 can be readily attached to a tractor. The crank 143 will then be turned again until the spring 134 is released to an extent such that its stress is approximately equal to that of the spring 130. Then, the pressure of the rake wheels may be increased or decreased during operation with very little difficulty.

What I claim is:

1. A device for operative association with a tractor and comprising a mobile frame, coupling means for coupling said frame in trailing relationship with respect to said tractor, rake wheels on said frame, running wheels operatively associated with said coupling means, a yoke pivoted to said coupling means, means operatively associated with said yoke to control the position thereof, a spring coupling said mobile frame to said yoke to support at least part of the weight of the rake wheels and frame, and means on said coupling means and operatively associated with said frame to adjust the position thereof relative to said coupling means and about a vertical axis.

2. A device as claimed in claim 1 comprising a spring on said coupling means and connected to said yoke.

3. A device as claimed in claim 1, wherein said frame includes aligned and slidably engaged sections, said device comprising means operatively associated with said sections to fix the relative positions of the same.

4. A device as claimed in claim 1 comprising means operatively associated with said spring to adjust the tension thereof.

5. A device as claimed in claim 2 comprising means operatively associated with the second said spring to adjust the tension thereof.

6. A device as claimed in claim 1 wherein said frame comprises a drawnarm and a horizontal beam connected to said drawarm, said rake wheels being supported on said beam.

7. A device as claimed in claim 6 comprising bows on said beam supporting said rake wheels in pairs.

8. A device as claimed in claim 1 wherein said running wheels are positioned generally ahead of said rake wheels.

References Cited in the file of this patent

UNITED STATES PATENTS

| | | |
|---|---|---|
| 2,265,405 | Strantz | Dec. 9, 1941 |
| 2,532,652 | Wray | Dec. 5, 1950 |
| 2,670,588 | Plant | Mar. 2, 1954 |
| 2,712,723 | Ryan | July 12, 1955 |
| 2,811,009 | Plant | Oct. 29, 1957 |
| 2,827,754 | Hill | Mar. 25, 1958 |

FOREIGN PATENTS

| | | |
|---|---|---|
| 1,014,517 | France | June 18, 1952 |
| 163,026 | Australia | May 25, 1955 |